United States Patent
Krivenok

(10) Patent No.: US 11,442,626 B2
(45) Date of Patent: Sep. 13, 2022

(54) NETWORK SCALING APPROACH FOR HYPER-CONVERGED INFRASTRUCTURE (HCI) AND HETEROGENEOUS STORAGE CLUSTERS

(71) Applicant: EMC IP Holding Company LLC, Hopkinton, MA (US)

(72) Inventor: Dmitry Vladimirovich Krivenok, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/242,757

(22) Filed: Apr. 28, 2021

(65) Prior Publication Data

US 2022/0091751 A1 Mar. 24, 2022

(30) Foreign Application Priority Data

Sep. 22, 2020 (RU) .......................... RU2020131246

(51) Int. Cl.
*G06F 3/06* (2006.01)

(52) U.S. Cl.
CPC ............ *G06F 3/0607* (2013.01); *G06F 3/067* (2013.01); *G06F 3/0617* (2013.01); *G06F 3/0658* (2013.01); *G06F 3/0665* (2013.01)

(58) Field of Classification Search
CPC ........ G06F 3/067; G06F 21/77; G06F 3/0604; G06F 3/0619; G06F 3/065; G06F 3/0659; G06F 3/0647; G06F 9/45558; G06F 11/1451; G06F 11/2094; G06F 16/275; G06F 2201/805; G06F 2201/82; G06F 2201/84; G06F 3/0617; G06F 3/0631; G06F 3/064; G06F 3/0653; G06F 3/0664; G06F 3/0683; G06F 3/0688; G06F 8/65; G06F 11/1438; G06F 11/1446; G06F 11/1469; G06F 11/2041; G06F 11/2069; G06F 11/2097; G06F 1/30; G06F 2009/4557; G06F 2009/45583; G06F 2009/45595; G06F 2201/815; G06F 3/0629;

(Continued)

(56) References Cited

U.S. PATENT DOCUMENTS 8,380,757 B1 2/2013 Bailey et al.
9,069,930 B1 6/2015 Hart (Continued)

*Primary Examiner* — Yong J Choe
(74) *Attorney, Agent, or Firm* — BainwoodHuang

(57) ABSTRACT

Network scaling techniques for HCI and/or heterogeneous storage clusters. The techniques are based on the use of cluster-wide logical networks and IP port abstractions. Each logical network represents a pool of IP addresses having a common set of properties. Each logical network has an associated type and a corresponding set of protocols that define its purpose. Each IP port abstraction is associated with physical and/or virtual network objects inherently visible to a storage administrator. Each IP port abstraction functions as a target for assignment of an IP address from a pool of IP addresses represented by a logical network. The IP port abstractions are backed by underlying heterogeneous network objects but have unified sets of capabilities. Network scaling can be implemented by applying one or more IP addresses represented by one or more logical networks to selected sets of IP port abstractions backed by underlying heterogeneous network objects.

17 Claims, 7 Drawing Sheets

(58) Field of Classification Search
CPC .... G06F 3/0665; G06F 3/0673; G06F 3/0689;
G06F 9/442; G06F 11/008; G06F
11/0727; G06F 11/0751; G06F 11/0766;
G06F 11/0772; G06F 11/079; G06F
11/1016; G06F 11/1076; G06F 11/1092;
G06F 11/1423; G06F 11/1435; G06F
11/1441; G06F 11/1448; G06F 11/1464;
G06F 11/1658; G06F 11/2025; G06F
11/203; G06F 11/2046; G06F 11/2048;
G06F 11/2082; G06F 11/3034; G06F
11/3037; G06F 11/3072; G06F 12/0246;
G06F 12/0253; G06F 12/06; G06F
12/0638; G06F 12/0804; G06F 13/385;
G06F 13/4068; G06F 16/1824; G06F
16/188; G06F 16/219; G06F 16/2379;
G06F 16/243; G06F 16/252; G06F
16/433; G06F 16/5838; G06F 16/60;
G06F 16/90339; G06F 16/907; G06F
17/18; G06F 1/28; G06F 2009/45562;
G06F 2009/45579; G06F 2009/45587;
G06F 2009/45591; G06F 2119/04; G06F
21/36; G06F 21/554; G06F 21/566; G06F
21/568; G06F 21/602; G06F 21/78; G06F
2201/80; G06F 2212/205; G06F
2212/7201; G06F 2212/7209; G06F
2221/2133; G06F 30/34; G06F 3/011;
G06F 3/017; G06F 3/0482; G06F 3/0607;
G06F 3/061; G06F 3/0614; G06F 3/0622;
G06F 3/0625; G06F 3/0632; G06F
3/0635; G06F 3/0641; G06F 3/0644;
G06F 3/0652; G06F 3/0656; G06F
3/0658; G06F 3/0679; G06F 3/0685;
G06F 3/165; G06F 3/167; G06F 7/588;
G06F 8/40; G06F 8/61; G06F 8/63; G06F
8/658; G06F 8/71; G06F 8/76; G06F
9/3885; G06F 9/44505; G06F 9/5072;
G06F 9/52; G06F 9/543; G06F 9/547
See application file for complete search history.

(56) References Cited

U.S. PATENT DOCUMENTS

| | | |
|---|---|---|
| 9,733,989 B1 | 8/2017 | Robidoux et al. |
| 9,778,956 B1 | 10/2017 | Harwood et al. |
| 2019/0149449 A1* | 5/2019 | Morris ................ H04L 45/745 709/245 |

* cited by examiner

NETWORK SCALING APPROACH FOR HYPER-CONVERGED INFRASTRUCTURE (HCI) AND HETEROGENEOUS STORAGE CLUSTERS

BACKGROUND

Storage clusters typically include multiple data storage appliances (also referred to herein as "storage controllers"), each of which can have an expandable number of network interfaces configured to support a few network ports to many network ports. Such storage clusters can have a hyper-converged infrastructure (HCI) with a heterogeneous configuration that includes not only physical storage controllers but also virtualized storage controllers, each of which can execute within a virtual machine (VM) and share at least a subset of network ports with an underlying hypervisor. Such storage clusters can be configured to support many various network related use-case scenarios such as those involving input/output (IO) servicing for internal and external storage clients; data mobility operations such as data replication and migration performed within the same storage cluster or across different storage clusters; data archiving to the public or private "cloud," as well as use-case scenarios related to hypervisor networking including live migration of virtual machines (VMs) executing within storage clusters.

SUMMARY

Typical heterogeneous storage clusters have drawbacks, however, particularly with regard to scaling from a few network ports to many network ports. Within such storage clusters, network configuration for different protocols has traditionally been performed on a per-port basis. If network traffic were to be enabled on multiple network ports using a desired protocol (e.g., iSCSI, NVMe-oF), then each network port had to be individually enabled with the desired protocol. However, such an approach to network configuration does not scale well and is generally unworkable for large heterogeneous storage clusters. Typical storage clusters with hyper-converged infrastructures also have drawbacks with regard to network scaling. Such HCI storage clusters have traditionally included multiple storage controllers of the same type, each requiring the same network hardware to satisfy balancing requirements. However, this severely limits network hardware options and makes it difficult to scale network resources while supporting both internal and external storage clients.

Improved network scaling techniques are disclosed herein that address many of the drawbacks of typical HCI and/or heterogeneous storage cluster configurations. The disclosed techniques are based on the use of logical networks and Internet protocol (IP) port abstractions within respective storage clusters. Each logical network can be configured to be cluster-wide and have an associated pool of IP addresses with a common set of properties, including a logical network identifier (ID), name, IP address range, IP version, network prefix, and so on. Each logical network can also have an associated type and a corresponding set of protocols that collectively define its purpose, such as management, intra-cluster communications, internal/external storage access, cloud storage access, data mobility, live migration of virtual machines (VMs), and so on. Each IP port abstraction can correspond to one or more physical and/or virtual network objects, which are inherently visible to a storage administrator computer. Such physical and/or virtual network objects can include physical and/or virtual network ports, bonded interfaces, and so on. Each IP port abstraction can be configured to function as a target for assignment of an IP address from a pool of IP addresses associated with a logical network. The respective IP port abstractions can be backed by underlying heterogeneous network objects (e.g., physical Ethernet ports, virtual Ethernet ports, bonded interfaces), but have unified sets of capabilities, each of which can be determined by the NIC characteristics/capabilities, software release of the storage cluster, type of storage controller deployment (e.g., physical, virtualized), software licensing, and so on. The disclosed network scaling techniques can include applying one or more IP addresses associated with one or more logical networks to selected sets of IP port abstractions backed by underlying heterogeneous network objects.

In certain embodiments, a method of network scaling in a hyper-converged infrastructure (HCI) or heterogeneous storage cluster includes providing a logical network of a storage cluster having a specified type and supporting one or more specified protocols. The logical network is associated with a plurality of Internet protocol (IP) addresses. The storage cluster includes a plurality of storage controllers. Each storage controller has a plurality of network objects associated therewith. The method further includes, for each storage controller, abstracting the plurality of network objects into a set of IP port abstractions, and assigning one or more of the plurality of IP addresses associated with the logical network to one or more network objects of one or more sets of IP port abstractions of the respective storage controllers.

In certain arrangements, the method includes providing a definition of the logical network that includes at least the specified type, the one or more specified protocols, and a specified IP address range for the plurality of IP addresses.

In certain arrangements, the method includes validating input data pertaining to the definition of the logical network and the set of IP port abstractions of the storage controller to determine whether network scaling can be successfully performed in the storage cluster.

In certain arrangements, the method includes, having successfully validated the input data, assigning a respective IP address from among the plurality of IP addresses to each IP port abstraction from among the set of IP port abstraction to form a plurality of IP address/IP port pairs.

In certain arrangements, the method includes, for each IP address/IP port pair, configuring the IP address of the IP address/IP port pair on a physical or virtual network object specified by the IP port abstraction.

In certain arrangements, the method includes aggregating groups of one or more IP address/IP port pairs from among the plurality of IP address/IP port pairs in a specified order.

In certain arrangements, the method includes configuring one or more storage stack applications to interface or access the groups of IP address/IP port pairs in the specified order.

In certain arrangements, the one or more specified protocols include a first specified protocol and a second specified protocol, and the method includes enabling the first specified protocol in the definition of the logical network and disabling the second specified protocol in the definition of the logical network.

In certain arrangements, the method includes enabling the first specified protocol in the definition of the logical network and enabling the second specified protocol in the definition of the logical network.

In certain arrangements, the method includes adding a new storage controller to the storage cluster. The new storage controller has one or more default network requirements. The method further includes providing the definition of the logical network that includes a respective specified protocol at least partially satisfying the default network requirements of the new storage controller.

In certain arrangements, the method includes enabling the respective specified protocol in the definition of the logical network, and automatically assigning a respective IP address associated with the logical network to a respective network object of a respective set of IP port abstractions of the new storage controller.

In certain arrangements, the plurality of network objects include one or more of a physical network port, a virtual network port, and a bonded interface. The method further includes, for each storage controller, specifying one or more of the physical network port, the virtual network port, and the bonded interface in the set of IP port abstractions.

In certain arrangements, the storage controller is a physical storage controller. The method further includes assigning one or more of the plurality of IP addresses associated with the logical network to the physical network port specified in a respective IP port abstraction of the physical storage controller.

In certain arrangements, the storage controller is a virtualized storage controller. The method further includes assigning one or more of the plurality of IP addresses associated with the logical network to the virtual network port specified in a respective IP port abstraction of the virtualized storage controller.

In certain arrangements, the method includes assigning one or more of the plurality of IP addresses associated with the logical network to the bonded interface specified in a respective IP port abstraction of the virtualized storage controller.

In certain arrangements, the method includes assigning one or more of the plurality of IP addresses to the bonded interface via one or more virtual local area networks (vLANs).

In certain embodiments, a system for network scaling in a hyper-converged infrastructure (HCI) or heterogeneous storage cluster includes a memory and processing circuitry configured to execute program instructions out of the memory to provide a logical network of a storage cluster having a specified type and supporting one or more specified protocols. The logical network is associated with a plurality of Internet protocol (IP) addresses. The storage cluster includes a plurality of storage controllers. Each storage controller has a plurality of network objects associated therewith. The processing circuitry is further configured to execute the program instructions out of the memory, for each storage controller, to abstract the plurality of network objects into a set of IP port abstractions, and to assign or apply one or more of the plurality of IP addresses associated with the logical network to one or more network objects of one or more sets of IP port abstractions of the respective storage controllers.

In certain arrangements, the plurality of network objects include one or more of a physical network port, a virtual network port, and a bonded interface. The processing circuitry is further configured to execute the program instructions out of the memory to specify one or more of the physical network port, the virtual network port, and the bonded interface in the set of IP port abstractions.

In certain embodiments, a computer program product includes a set of non-transitory, computer-readable media having instructions that, when executed by processing circuitry, cause the processing circuitry to perform a method that includes providing a logical network of a storage cluster having a specified type and supporting one or more specified protocols. The logical network is associated with a plurality of Internet protocol (IP) addresses. The storage cluster includes a plurality of storage controllers. Each storage controller has a plurality of network objects associated therewith. The method further includes, for each storage controller, abstracting the plurality of network objects into a set of IP port abstractions, and assigning one or more of the plurality of IP addresses associated with the logical network to one or more network objects of one or more sets of IP port abstractions of the respective storage controllers.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Network scaling techniques are disclosed herein for hyper-converged infrastructure (HCI) and/or heterogeneous storage clusters. The disclosed techniques are based on the use of logical networks and Internet protocol (IP) port abstractions. Each logical network can be configured to be cluster-wide and associated with a pool of IP addresses having a common set of properties. Each logical network can have an associated type and a corresponding set of protocols, which collectively define its purpose. Each IP port abstraction can correspond to physical and/or virtual network objects that are inherently visible to a storage administrator computer. Each IP port abstraction can be configured to function as a target for assignment of an IP address from a pool of IP addresses associated with a logical network. The IP port abstractions can be backed by underlying heterogeneous network objects but have unified sets of capabilities. In the disclosed techniques, network scaling can be implemented by applying one or more IP addresses associated with one or more logical networks to selected sets of IP port abstractions backed by underlying heterogeneous network objects.

Figure 1:
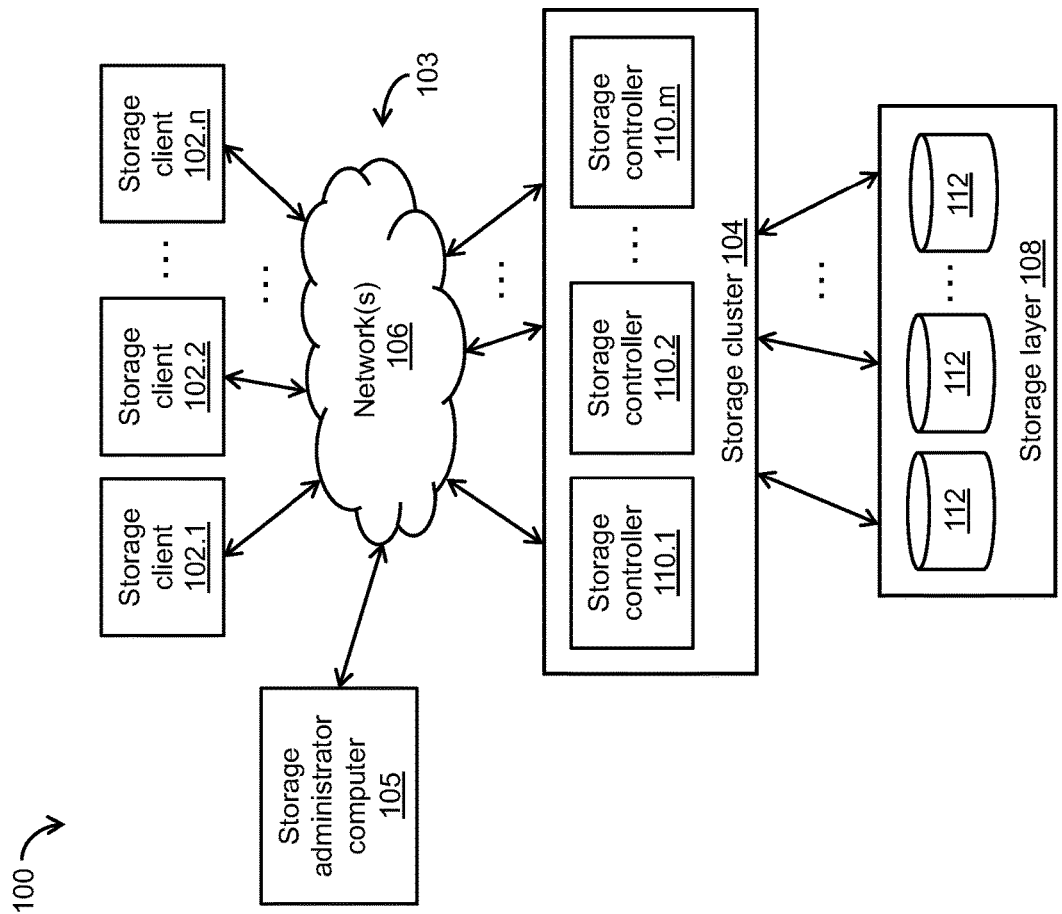
FIG. 1 is a block diagram of an exemplary storage system environment, in which network scaling techniques can be practiced for hyper-converged infrastructure (HCI) and/or heterogeneous storage clusters.

FIG. 1 depicts an illustrative embodiment of an exemplary storage system environment 100, in which network scaling techniques can be practiced for HCI and/or heterogeneous storage clusters. As shown in FIG. 1, the storage system environment 100 can include a plurality of storage client computers (also referred to herein as "storage client(s)") 102.1, 102.2, ..., 102.n, a storage cluster 104, a storage administrator computer 105, and a communications medium 103 that includes at least one network 106. For example, each of the plurality of storage clients 102.1, ..., 102.n can be configured as a web server computer, a file server computer, an email server computer, an enterprise server computer, and/or any other suitable client/server computer or computerized device. The plurality of storage clients 102.1, ..., 102.n can provide, over the network(s) 106, storage input/output (IO) requests (e.g., small computer system interface (iSCSI) commands, network file system (NFS) commands) to the storage cluster 104. Such storage IO requests (e.g., write IO requests, read IO requests) can direct a storage processor or processing circuitry (also referred to herein as a "storage node") to write or read data blocks, data pages, data files, or any other suitable data elements to/from volumes (VOLs), virtual volumes (vVOLs), logical units (LUs), file systems, and/or any other suitable physical and/or virtual storage objects maintained in association with the storage cluster 104. The storage administrator computer 105 can be configured as a desktop computer, a laptop computer, a tablet computer, a smartphone, and so on. The storage administrator computer 105 can provide an interface by which a storage administrator (or orchestrator) can interact with the storage cluster 104. The storage system environment 100 can further include a storage layer 108, which can include a plurality of storage objects or devices 112 such as solid-state drive (SSD) device(s), hard disk drive (HDD) device(s), non-volatile memory (NVM) device(s), and/or any other suitable device(s) or entities for storing storage object data and/or metadata. In some embodiments, the storage objects/devices 112 of the storage layer 108 can reside in the storage cluster 104. The storage layer 108 can be communicably coupled to the respective storage clients 102.1, ..., 102.n through the storage cluster 104 via the network(s) 106 of the communications medium 103.

The communications medium 103 can be configured to interconnect the plurality of storage clients 102.1, ..., 102.n and the storage cluster 104 to enable them to communicate and exchange data and/or control signaling. As shown in FIG. 1, the communications medium 103 can be illustrated as a "cloud" to represent a wide range of different network topologies. As employed herein, the term "topology" can refer to any suitable network configuration and/or network interface elements for supporting inter-node communications between client and/or server nodes within the storage system environment 100. The communications medium 103 can include copper-based data communications devices and cabling, fiber optic-based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

As described herein, the storage system environment 100 can include the storage cluster 104. As shown in FIG. 1, the storage cluster 104 can include a plurality of data storage appliances (also referred to herein as "storage controllers") 110.1, 110.2, ..., 110.m. In some embodiments, the storage cluster 104 can be configured as an HCI or heterogeneous storage cluster having a network configuration that spans across multiple such storage controllers, hypervisor hosts, physical storage controllers, virtualized storage controllers, virtualization managers, physical network fabrics, and so on. The respective storage controllers 110.1, ..., 110.m can include different numbers of network ports and/or IO modules. The storage cluster 104 can be further configured to support multiple cluster-wide logical networks having different requirements and/or data traffic patterns. Multiple physical networks can be consolidated into a single logical network, or a single physical network can be segmented into multiple logical networks. Such logical networks can each have an associated type and a corresponding set of protocols that collectively define its purpose, such as management, intra-cluster communications, internal/external storage access, cloud storage access, data mobility, live migration of virtual machines (VMs), and so on.

Figure 2A:
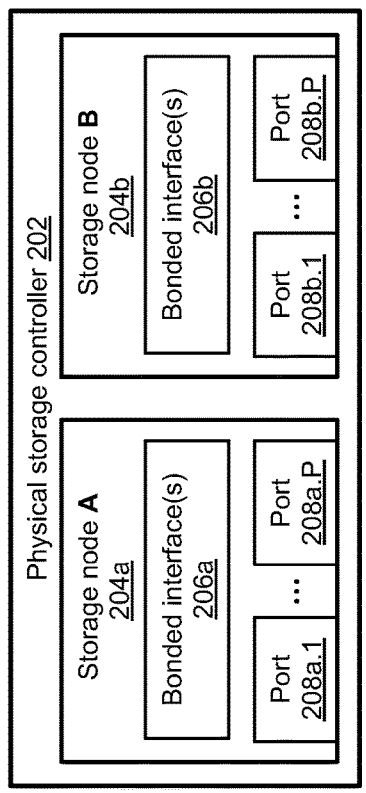
FIG. 2a is a block diagram of an exemplary physical storage controller that can be employed in an HCI or heterogeneous storage cluster within the storage system environment of FIG. 1.

FIG. 2a depicts an exemplary physical storage controller 202 that can be employed in the storage cluster 104 of FIG. 1. As shown in FIG. 2a, the physical storage controller 202 can include dual storage nodes, namely, a storage node A 204a and a storage node B 204b. In some embodiments, the storage nodes A 204a, B 204b can be arranged in an active-active configuration in a highly available storage system, in which the storage nodes A 204a, B 204b can have read-write IO access to the same storage objects (e.g., volumes (VOLs), virtual volumes (vVOLs), logical units (LUs), file systems) or other shared resources. The storage nodes A 204a, B 204b can receive storage IO requests from the respective storage clients 102.1, ..., 102.n over the network(s) 106. For example, in response to the storage IO requests, the storage node A 204a can perform storage IO operations (e.g., write IO operations, read IO operations) to write/read data blocks, data pages, data files, or any other suitable data elements to/from one or more of the storage objects or devices 112 in the storage layer 108. In the event of a failure of the storage node A 204a or at any other suitable time, the storage node B 204b can assume the role and/or duties of the storage node A 204a with regard to the handling of storage IO requests, providing high availability within the storage cluster 104. As further shown in FIG. 2a, the storage node A 204a can include a plurality of interfaces, such as one or more bonded interfaces 206a. Each such bonded interface 206a can be a logical interface that effectively bonds together two or more ports 208a.1, . . . , 208a.P (e.g., physical Ethernet ports) to form a single unified port interface. Like the storage node A 204a, the storage node B 204b can include a plurality of interfaces, such as one or more bonded interfaces 206b. Each such bonded interface 206b can be a logical interface that effectively bonds together two or more ports 208b.1, . . . , 208b.P (e.g., physical Ethernet ports) to form a single unified port interface.

Figure 2B:
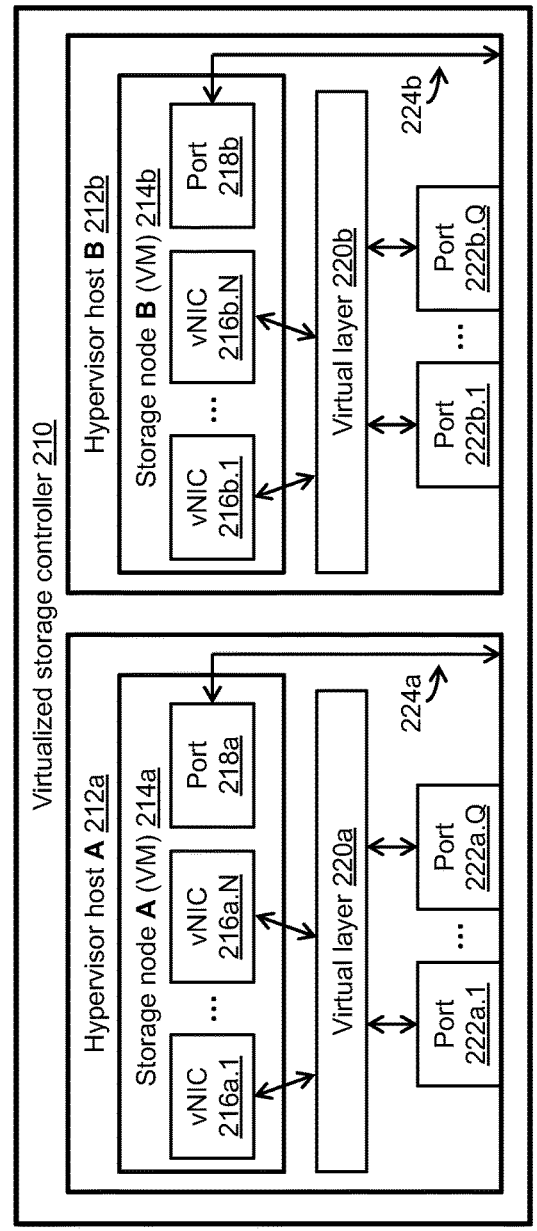
FIG. 2b is a block diagram of an exemplary virtualized storage controller that can be employed in an HCI or heterogeneous storage cluster within the storage system environment of FIG. 1.

FIG. 2b depicts an exemplary virtualized storage controller 210, which, like the physical storage controller 202 (see FIG. 2a), can be employed in the storage cluster 104 of FIG. 1. As shown in FIG. 2b, the virtualized storage controller 210 can include dual storage nodes, namely, a storage node A (VM) 214a and a storage node B (VM) 214b, each of which can be embodied as a virtual machine (VM). Like the storage nodes A 204a, B 204b of the physical storage controller 202, the storage nodes A (VM) 214a, B (VM) 214b of the virtualized storage controller 210 can be arranged in an active-active configuration in a highly available storage system. The storage node A (VM) 214a can include one or more virtual ports embodied as virtual network interface cards (vNIC(s)) 216a.1, . . . , 216a.N (e.g., virtual Ethernet ports). As further shown in FIG. 2b, the storage node A (VM) 214a can be configured to execute on a hypervisor host A 212a, which can have a virtual layer 220a and one or more ports 222a.1, . . . , 222a.Q associated therewith. The vNICs 216a.1, . . . , 216a.N can be effectively connected to the ports 222a.1, . . . , 222a.Q via the virtual layer 220a.

In hypervisor hosts with large numbers of associated ports, one or more of the ports can be configured in a "pass-through" mode such that the ports are directly managed by the storage nodes executing on the hypervisor hosts. As shown in FIG. 2b, the storage node A (VM) 214a can have an associated port 218a configured in the pass-through mode. As such, the port 218a can be configured to completely (or at least partially) bypass the virtual layer 220a on the hypervisor host A 212a, as illustrated by a line 224a. Like the storage node A (VM) 214a, the storage node B (VM) 214b can include one or more virtual ports embodied as vNIC(s) 216b.1, . . . , 216b.N (e.g., virtual Ethernet ports). The storage node B (VM) 214b can be configured to execute on a hypervisor host B 212b, which can have a virtual layer 220b and one or more ports 222b.1, . . . , 222b.Q associated therewith. The vNICs 216b.1, . . . , 216b.N can be effectively connected to the ports 222b.1, . . . , 222b.Q via the virtual layer 220b. The storage node B (VM) 214b can also have an associated port 218b configured in the pass-through mode. As such, the port 218b can be configured to completely (or at least partially) bypass the virtual layer 220b on the hypervisor host B 212b, as illustrated by a line 224b.

Figure 3:
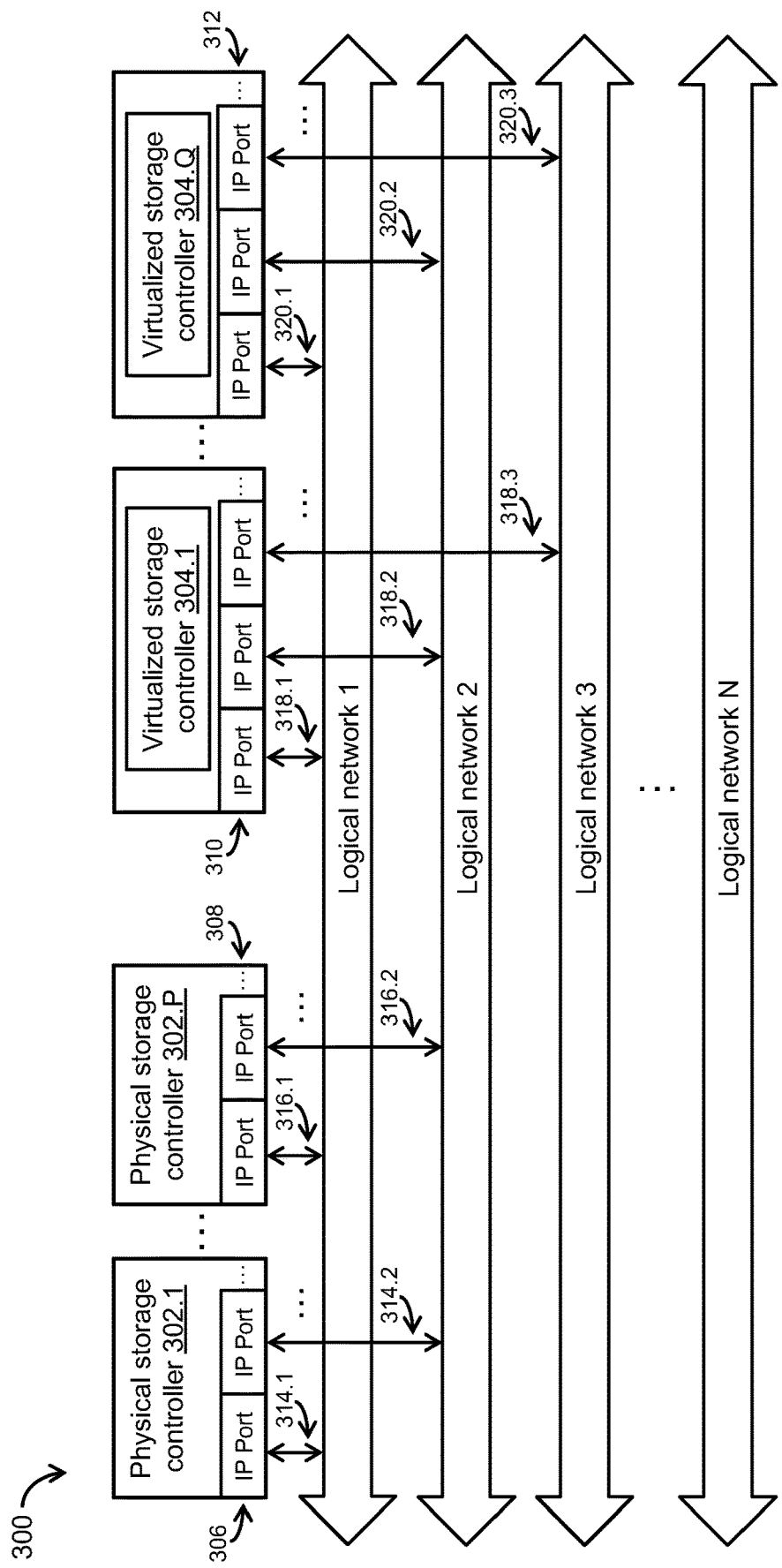
FIG. 3 is a block diagram of a plurality of exemplary logical networks, a plurality of exemplary physical storage controllers, and a plurality of exemplary virtualized storage controllers, in which each of the physical and virtualized storage controllers is effectively attached to one or more of the plurality of logical networks via one or more exemplary Internet protocol (IP) port abstractions backed by underlying heterogeneous network objects.

As described herein, the storage cluster 104 of FIG. 1 can be configured to support multiple cluster-wide logical networks. FIG. 3 depicts a plurality of exemplary logical networks 1, 2, 3, . . . , N that can be supported by the storage cluster 104. In some embodiments, each logical network 1, . . . , N can be associated with a pool of IP addresses having a common set of properties, including a logical network identifier (ID), name, type/purpose, IP address range, IP version, network prefix, routing (e.g., gateway, static routes), vLAN identifier (ID), maximum transmission unit (MTU), protocol(s) (e.g., iSCSI, NVMe-oF, NVMe/TCP, NVMe/ROCEv2), and so on. Although the logical networks 1, . . . , N can be cluster-wide, they can be assigned or applied to all or a selected subset of the storage controllers 110.1, . . . , 110.m in the storage cluster 104. For example, in a heterogeneous storage cluster including one or more HCI storage controllers, a logical network whose purpose is live migration of VMs can be configured only on the respective HCI storage controllers. The IP addresses associated with the respective logical networks 1, . . . , N can be configured on dedicated or shared ports of one or more of the storage controllers 110.1, . . . , 110.m within the storage cluster 104, such as one or more physical storage controllers 302.1, . . . , 302.P and/or one or more virtualized storage controllers 304.1, . . . , 304.Q (see FIG. 3).

It is noted that logical networks such as the logical networks 1, . . . , N of FIG. 3 can effectively unify the network configuration of the storage cluster 104 of FIG. 1, as well as help to guarantee that the configurations of the physical and/or virtualized storage controllers within the storage cluster 104 are consistent, where required or desired. Further, logical networks of the same type or different types can be defined and assigned or applied to the storage controllers 110.1, . . . , 110.m within the storage cluster 104 in an asymmetrical manner. For example, if it is desired that a storage controller be part of an IP sub-network configured to provide iSCSI block storage, then a new logical network with only the iSCSI protocol enabled can be added to the storage cluster 104, and one or more IP addresses associated with the newly added logical network can be assigned or applied to one or more ports of the storage controller. In this way, IP addresses of a specific logical network can be assigned or applied to some or all of the available ports on a storage controller within the storage cluster 104.

Scaling from a few network ports to many network ports within the storage cluster 104 of FIG. 1 can be a challenging task due to the complexity of HCI and/or heterogeneous clustered storage systems. For example, in such complex storage systems, many NICs may be installed on physical storage controllers of a storage cluster. Some NICs may be installed on-board the physical storage controllers, while other NICs may be hot or cold installable on the physical storage controllers. Further, some NICs may have different hardware capabilities (e.g., remote direct memory access (RDMA) capabilities, hardware offload capabilities), have different numbers of network ports, support different data speeds, and so on. In such physical storage controllers, IP addresses may be configured directly on operating system (OS) interfaces representing physical network ports of the NICs. IP addresses may also be configured on other logical entities conceptually disposed on top of the physical network ports of the NICs. For example, such logical entities may include bonded interfaces, in which two or more physical network ports are aggregated into a single logical interface to increase bandwidth and/or provide high availability at the network level. Such logical entities may also include vLANs, which may be implemented as logical interfaces disposed between the IP addresses and the physical network ports.

Moreover, in such complex storage systems, virtualized storage controllers may be associated with network ports that are shared between hypervisors and storage nodes implemented by virtual machines (VMs) executing on the hypervisors. Such hypervisors may virtualize or emulate a physical network via a virtual layer that includes virtual switches (vSwitches), which may employ physical network ports as uplinks and provide connectivity for virtual ports implemented by virtual network interface cards (vNICs). Such hypervisors may allow physical network ports to pass directly to VMs via hypervisor-specific pass-through mechanisms, thereby avoiding the overhead of the virtual layer. Such hypervisors may also require access to the physical network via logical interfaces to provide management capabilities, clustering capabilities, VM live migration capabilities, access to internal/external storage, and so on. Such logical interfaces may be effectively attached to the vSwitches in the virtual layer. Such hypervisors may also implement constructs such as port groups for determining common network properties for hypervisor interfaces and/or vNICs, as well as high availability and/or vLAN configurations on a per-port group basis.

To achieve network scaling in complex HCI and/or heterogeneous storage clusters without unduly exposing internal implementation details of physical and/or virtualized storage controllers within the storage clusters, the disclosed network scaling techniques employ logical networks (e.g., the logical networks 1, . . . , N; see FIG. 3) and logical abstractions of heterogeneous network objects (also referred to herein as "IP port abstraction(s)" or "IP port(s)"). As shown in FIG. 3, one or more IP ports 306 can be associated with the physical storage controller 302.1. Further, IP addresses from the logical networks 1, 2 can be configured on the IP ports 306 of the physical storage controller 302.1, as illustratively indicated by lines 314.1, 314.2, . . . . Likewise, one or more IP ports 308 can be associated with the physical storage controller 302.P. Further, IP addresses from the logical networks 1, 2 can be configured on the IP ports 308 of the physical storage controller 302.P, as illustratively indicated by lines 316.1, 316.2, . . . . In addition, one or more IP ports 310 can be associated with the virtualized storage controller 304.1. Further, IP addresses from the logical networks 1, 2, 3 can be configured on the IP ports 310 of the virtualized storage controller 304.1, as illustratively indicated by lines 318.1, 318.2, 318.3, . . . . Likewise, one or more IP ports 312 can be associated with the virtualized storage controller 304.Q. Further, IP addresses from the logical networks 1, 2, 3 can be configured on the IP ports 312 of the virtualized storage controller 304.Q, as illustratively indicated by lines 320.1, 320.2, 320.3, . . . . It is noted that various other IP port associations of the physical and/or virtualized storage controllers 302.1, . . . , 302.P, 304.1, . . . , 304.Q, as well as various other IP address/IP port configurations of the logical networks 1, . . . , N, are possible.

It is further noted that each IP port can be associated with one or more physical and/or virtual network objects of the respective physical and/or virtualized storage controllers 302.1, . . . , 302.P, 304.1, . . . , 304.Q. Each such physical and/or virtual network object of the respective storage controllers can be inherently visible to the storage administrator computer 105. In some embodiments, such physical and/or virtual network objects can include physical network ports (e.g., physical Ethernet ports), virtual network ports (e.g., virtual Ethernet ports), bonded interfaces, and so on. Further, each IP port can be configured to function as a target for assignment of an IP address from a pool of IP addresses associated with a logical network. The respective IP ports can be backed by underlying heterogeneous network objects (e.g., network interface cards (NICs) with heterogeneous characteristics and/or capabilities) but have unified sets of capabilities, each of which can be determined by the NIC characteristics/capabilities, software release of the storage cluster, type of storage controller deployment (e.g., physical, virtualized), software licensing, and so on.

In the disclosed techniques, network scaling can be implemented by applying one or more IP addresses associated with one or more logical networks to selected sets of IP ports backed by underlying heterogeneous network objects. In some embodiments, such IP addresses can be configured directly on operating system (OS) interfaces representing physical network ports of a NIC. In other embodiments, such IP addresses can be configured on logical entities (e.g., vLANs, bonded interfaces) conceptually disposed on top of the OS interfaces representing the physical network ports.

Figure 4A:
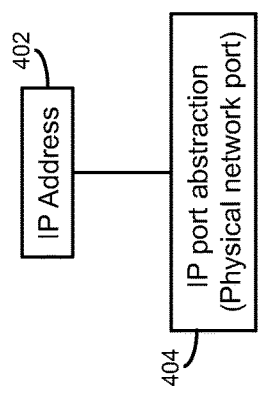
FIG. 4a is a block diagram of an exemplary IP address from a pool of IP addresses associated with a logical network, in which the IP address is assigned or applied to an underlying network object of an IP port abstraction, namely, a physical network port.
Figure 4C:
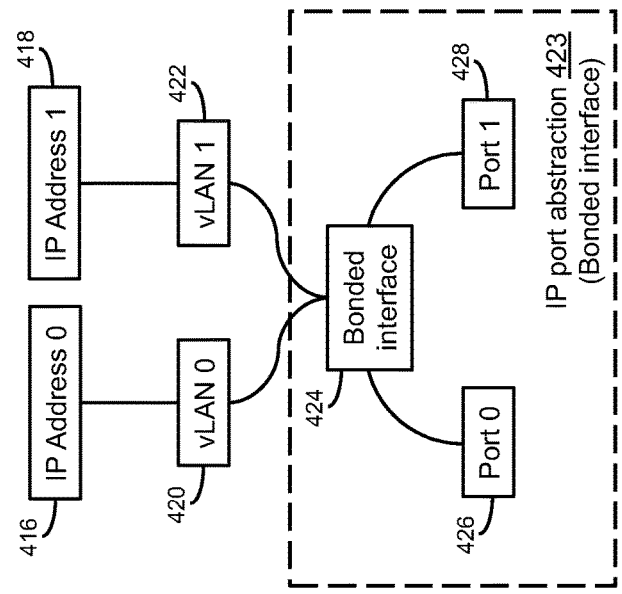
FIG. 4c is a block diagram of a pair of exemplary IP addresses from a pool of IP addresses associated with a logical network, in which each IP address is assigned or applied, via a vLAN, to the same underlying network object of an IP port abstraction, namely, a bonded interface.
Figure 4B:
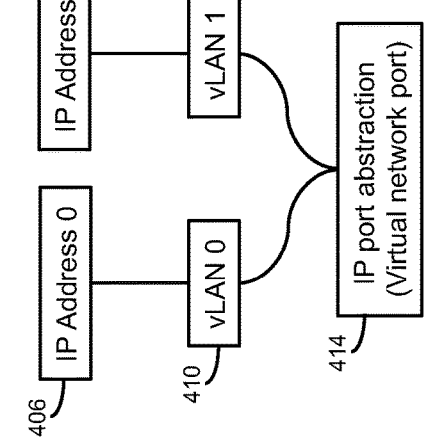
FIG. 4b is a block diagram of a pair of exemplary IP addresses from a pool of IP addresses associated with a logical network, in which each IP address is assigned or applied, via a virtual local area network (vLAN), to the same underlying network object of an IP port abstraction, namely, a virtual network port.

FIG. 4a depicts in illustrative form an IP address 402 associated with a logical network (not shown) assigned or applied to an IP port abstraction (IP port) 404 backed by an underlying network object, namely, a physical network port (e.g., physical Ethernet port). Such a physical network port, which is inherently visible to the storage administrator computer 105, can be physically connected to a network fabric and have administrative and/or operational statuses. FIG. 4b depicts in illustrative form an IP address 406 and an IP address 408 associated with a logical network (not shown) assigned or applied via a vLAN "0" 410 and a vLAN "1" 412, respectively, to an IP port abstraction (IP port) 414, which is backed by an underlying network object, namely, a virtual port (e.g., a virtual Ethernet port). Such a virtual port, which is inherently visible to the storage administrator computer 105, is regarded as a first-class citizen in a virtualized environment and determines how a virtual machine (VM) connects to a physical network. FIG. 4c depicts in illustrative form an IP address 416 and an IP address 418 associated with a logical network (not shown) assigned or applied via a vLAN "0" 420 and a vLAN "1" 422, respectively, to an IP port abstraction (IP port) 423, which is backed by an underlying network object, namely, a bonded interface. As shown in FIG. 4c, the bonded interface of the IP port 423 can include a bonded interface 424 for two underlying network ports, namely, a port "0" 426 and a port "1" 428. Such a bonded interface can be configured to form a single unified interface for the ports "0" 426, "1" 428.

Figure 4D:
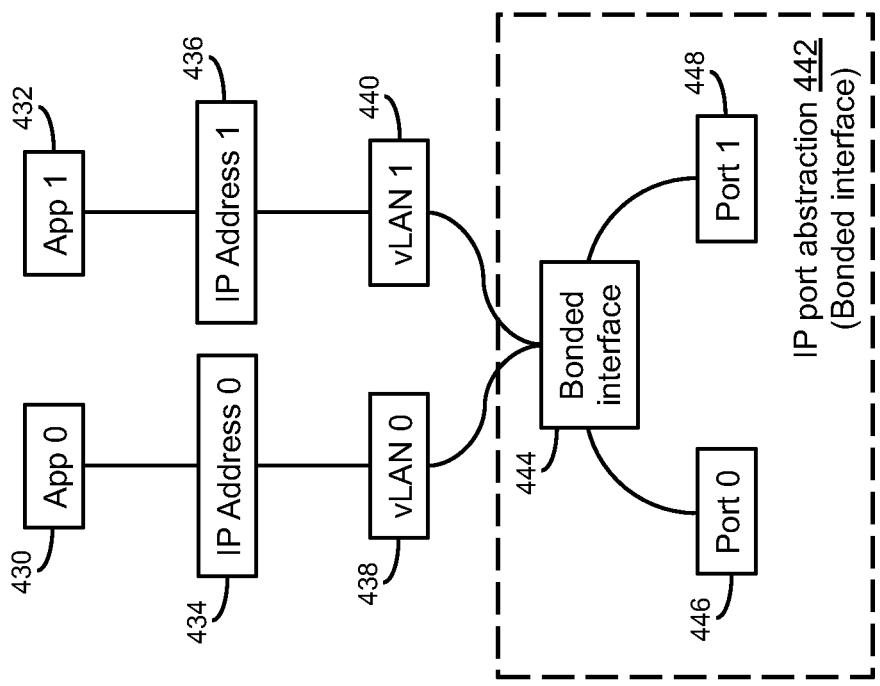
FIG. 4d is a block diagram of a pair of exemplary IP addresses from a pool of IP addresses associated with a logical network, in which each IP address is assigned or applied, via a vLAN, to the same underlying network object of an IP port abstraction, namely, a bonded interface, and integrated with a respective storage stack application.

FIG. 4d depicts in illustrative form an IP address "0" 434 and an IP address "1" 436 associated with a logical network (not shown) assigned or applied via a vLAN "0" 438 and a vLAN "1" 440, respectively, to an IP port abstraction (IP port) 442. As shown in FIG. 4d, the IP port abstraction 442 can be backed by an underlying network object, namely, a bonded interface. As shown in FIG. 4d, the bonded interface of the IP port 442 can include a bonded interface 444 for two underlying network ports, namely, a port "0" 446 and a port "1" 448. Such a bonded interface can be configured to form a single unified interface for the ports "0" 446, "1" 448. As further shown in FIG. 4d, a storage stack application (App) "0" 430 and a storage stack application (App) "1" 432 can be configured to interface, access, or be integrated with the IP address "0" 434 and the IP address "1" 436, respectively. In some embodiments, the storage stack applications (Apps) "0" 430, "1" 432 can be configured to interface, access, or be integrated with a logical interface conceptually disposed on top of the IP port abstraction 442. It is noted that the set of properties set forth in the definition of the logical network, such as its type/purpose and/or enabled protocols, can determine whether the storage stack applications (Apps) "0" 430, "1" 432 or any other suitable applications can be successfully integrated with the IP addresses "0" 434, "1" 436. In some embodiments, a mapping can be established between the protocols defined for the logical network and the storage stack applications (Apps) "0" 430, "1" 432. It is further noted that the storage stack applications (Apps) "0" 430, "1" 432 can be integrated with the IP addresses "0" 434, "1" 436 via application-specific APIs.

The disclosed network scaling techniques will be further understood with reference to the following illustrative example. In this example, it is required that a physical or virtualized storage controller within the storage cluster 104 be part of an IP sub-network configured to provide iSCSI block storage. To that end, a system administrator (or orchestrator) employs the storage administrator computer 105 to add and define a new logical network to the storage cluster 104. In this example, the newly added logical network is defined, as follows:

ID: N1
Name: "iSCSI Storage Network"
Type: Storage
IP address range: 10.0.1.20 to 10.0.1.33
IP version: IPv4
Prefix:/24
Routing:
  Gw: 10.0.1.1
  Rt: 10.0.2.0/24 via 10.0.1.2
vLAN ID: 1082
MTU: 9000
Protocols:
  iSCSI: enabled ("on")
  NVMe/TCP: disabled ("off")
  NVMe/ROCEv2: disabled ("off")

As indicated in the above logical network definition, the newly added logical network ("iSCSI Storage Network") is associated with a pool of IP addresses in the specified IP address range of 10.0.1.20 to 10.0.1.33 and has the iSCSI protocol enabled ("on"). Having defined the logical network, the system administrator (or orchestrator) employs the storage administrator computer 105 to assign one or more IP addresses in the specified IP address range (e.g., 10.0.1.20 to 10.0.1.33) to one or more network objects of the physical or virtualized storage controller. In this example, each network object of the physical or virtualized storage controller is abstracted and specified in an IP port abstraction, such as a physical network object (e.g., physical Ethernet port), virtual network object (e.g., virtual Ethernet port), bonded interface, and so on. It is noted that the respective network objects of the physical or virtualized storage controller are backed by underlying network objects such as NICs, vNICs, vLANs, and so on.

In the disclosed techniques, network scaling can be performed in an explicit fashion by the storage administrator (or orchestrator) via one or more application programming interfaces (API(s)) or other user interface(s) (UI(s)) provided by an API gateway of the storage cluster 104. For example, such explicit network scaling can be performed to assign one or more additional IP addresses associated with a logical network to network ports of a storage controller, thereby increasing the bandwidth of the storage controller. Further, such explicit network scaling can be performed to define multiple logical networks of the same type (e.g., "Storage") but having different protocols enabled for sub-networks determined by different ranges of IP addresses. In some embodiments, a conceptual level description of an API (also referred to herein as a "conceptual API") for performing a process of explicit network scaling can be defined, as follows:

$$\text{ScalingResult Scale(LogicalNetwork, Set<IPPort>),} \qquad (1)$$

in which "LogicalNetwork" corresponds to an identifier (ID) of a logical network being scaled, and "Set<IPPort>" corresponds to a set of IP ports.

In some embodiments, a conceptual API for performing a reverse process of explicit network scaling (also referred to herein as "unscaling") can be defined, as follows:

$$\text{UnScalingResult UnScale(LogicalNetwork, Set<IPPort>),} \qquad (2)$$

in which "LogicalNetwork" corresponds to an ID of a logical network being unscaled, and "Set<IPPort>" corresponds to a set of IP ports. For example, the conceptual APIs (1), (2) can be implemented as REST APIs or any other suitable APIs. It is noted that such conceptual APIs can allow a logical network to be scaled to any number of IP ports backed by heterogeneous network objects. Further, because such a logical network is cluster-wide, the conceptual APIs (1), (2) are likewise deemed to be cluster-wide. Such conceptual APIs can be configured to operate on sets of IP ports belonging to any physical and/or virtualized storage controller in an HCI and/or heterogeneous storage cluster.

Figure 5:
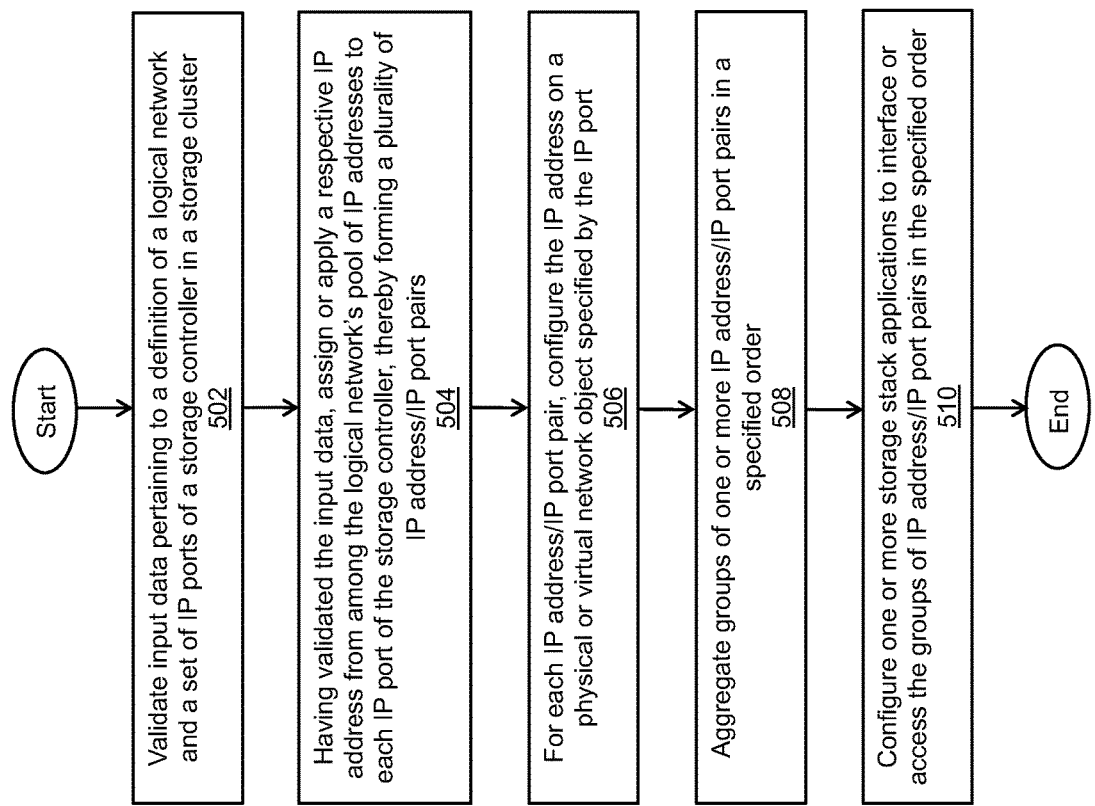
FIG. 5 is a flow diagram of an exemplary method of performing network scaling in HCI and/or heterogeneous storage clusters.

An exemplary method of network scaling in an HCI and/or heterogeneous storage cluster is described below with reference to FIG. 5. As depicted in block 502, input data pertaining to a definition of a logical network and a set of IP ports of a storage controller are validated to determine whether such network scaling can be successfully performed. For example, such a validation can be performed to determine whether the logical network has a sufficient number of unassigned IP addresses in its pool of IP addresses, whether the set of IP ports has capabilities compatible with the type and/or protocols specified in the definition of the logical network, and so on. As depicted in block 504, having validated the input data, a respective IP address from among the logical network's pool of IP addresses is assigned or applied to each IP port of the storage controller, thereby forming a plurality of IP address/IP port pairs. As depicted in block 506, for each IP address/IP port pair, the IP address is configured on a physical or virtual network object specified by the IP port. It is noted that such IP address configurations for the plurality of IP address/IP port pairs can be performed sequentially, in parallel, or in any desired order. As depicted in block 508, groups of one or more IP address/IP port pairs are aggregated in a specified order. As depicted in block 510, one or more storage stack applications are configured to interface or access the groups of IP address/IP port pairs in the specified order. For example, the storage stack applications can correspond to an iSCSI target application, an iSCSI initiator application, or any other suitable application. Further, the iSCSI target application can be configured to start accessing a group of IP address/IP port pairs before the iSCSI initiator application starts accessing the group of IP address/IP port pairs to avoid any conflicts or inconsistencies in the execution of the respective storage stack applications. It is noted that an exemplary method of network "unscaling" can be described that performs substantially the same actions set forth in blocks 502, 504, 506, 508, but in reverse order.

As described above, the disclosed network scaling techniques can be performed in an explicit fashion by the storage administrator (or orchestrator). In some embodiments, the disclosed network scaling techniques can be performed in an implicit fashion. For example, a storage controller having one or more existing IP ports can be added to a storage cluster that includes one or more pre-defined logical networks, which can have purposes such as management, intra-cluster communications, internal/external storage access, cloud storage access, data mobility, live migration of virtual machines (VMs), and so on. Once the storage controller is added to the storage cluster, one or more of the pre-defined logical networks can be automatically configured to satisfy default network requirements of the storage controller. For example, one or more unassigned IP addresses of a management logical network, a storage logical network, and/or any other suitable pre-defined logical network(s) of the storage cluster can be automatically assigned or applied to one or more existing IP ports of the storage controller. Further, one or more unassigned IP addresses of a VM live migration logical network can be automatically assigned or applied to one or more existing IP ports associated with a hypervisor host of the storage controller. Other use-case scenarios for automatically configuring pre-defined logical networks of a storage cluster to satisfy the default network requirements of storage controllers are possible. It is noted that, like the explicit network scaling technique described herein, the implicit network scaling technique can employ the method of network scaling depicted in FIG. 5.

Figure 6:
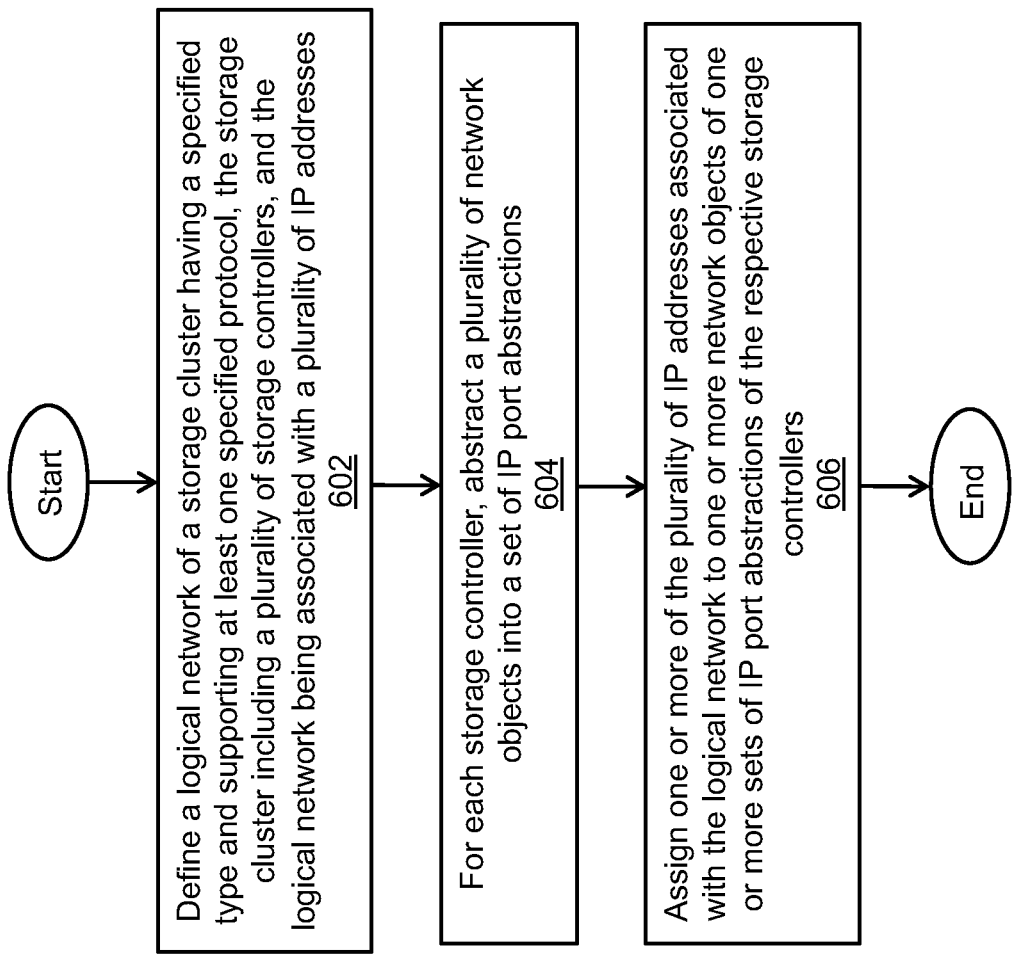
FIG. 6 is a flow diagram of another exemplary method of performing network scaling in HCI and/or heterogeneous storage clusters.

Another exemplary method of network scaling in an HCI or heterogeneous storage cluster is described below with reference to FIG. 6. As depicted in block 602, a logical network of a storage cluster is defined having a specified type and supporting at least one specified protocol, in which the storage cluster includes a plurality of storage controllers and the logical network is associated with a plurality of IP addresses. As depicted in block 604, for each storage controller, a plurality of network objects are abstracted into a set of IP port abstractions. As depicted in block 606, one or more of the plurality of IP addresses associated with the logical network are assigned or applied to one or more network objects of one or more sets of IP port abstractions of the respective storage controllers.

Having described the above illustrative embodiments, other alternative embodiments or variations can be made and/or practiced. For example, it was described herein that the disclosed network scaling techniques are based on the use of logical networks and IP port abstractions (IP ports). Such IP ports can be associated with physical and/or virtualized storage controllers in a complex HCI and/or heterogeneous clustered storage system. In some embodiments, the disclosed network scaling techniques can be performed at any suitable level of granularity, ranging from a single IP port up to all available IP ports in a storage cluster. For example, in a physical or virtualized storage controller that includes a single storage node, the level of granularity can be a single IP port. In a physical or virtualized storage controller that includes dual storage nodes, the level of granularity can be a pair of IP ports. In the disclosed network scaling techniques, such levels of granularity can be enforced by one or more management stack applications executing on one or more of the physical and/or virtualized storage controllers in the HCI and/or heterogeneous clustered storage system.

It was further described herein that storage stack applications can be integrated with one or more IP addresses from among a pool of IP addresses associated with a logical network in a storage cluster. In some embodiments, such storage stack applications can correspond to use-case scenarios involving block storage, cloud tiering, data mobility, and so on. With regard to use-case scenarios involving iSCSI block storage, an iSCSI target can be provided per storage controller, per network port, or per storage volume. Further, each iSCSI target can be associated with one or more iSCSI port groups, in which each iSCSI port corresponds to a combination of an IP address and a TCP port. If an iSCSI target is provided per storage node, then all IP addresses of a logical network having the iSCSI protocol enabled can be associated with the iSCSI ports of an iSCSI port group for that iSCSI target. If an iSCSI target is created for each IP port, then an iSCSI port group can have iSCSI ports with associated IP addresses assigned or applied only to the underlying IP port. If the NVMe-oF block storage protocol were employed instead of the iSCSI protocol, then each IP address of a logical network can be registered as a transport address for an NVMe-oF target, along with other parameters such as NVMe transport type (e.g., TCP, ROCEv2), port number, and so on. It is noted that the same IP address of a logical network can be associated with an iSCSI target port and an NVMe-oF target port, so long as both the iSCSI protocol and the NVMe-oF protocol are enabled in the definition of the logical network.

With regard to use-case scenarios involving cloud tiering, cold data can be tiered to the public or private cloud via protocols such as Amazon® S3 and so on. However, connectivity to the cloud can often require separate IP networks due to routing and/or security restrictions that can limit existing storage networks to internal use only. Using the disclosed network scaling techniques, one or more logical networks can be defined with the type or purpose of providing the desired cloud storage access. For example, a single logical network can be defined with the purpose of providing access to all public and/or private clouds, multiple logical networks can be defined with the purpose of providing separate access to the public or private clouds, and so on.

With regard to use-case scenarios involving data mobility such as volume migration, synchronous replication, asynchronous replication, and so on, routable IP networks are typically required on both the source side and the destination side of the data mobility. The disclosed network scaling techniques can be successfully employed in many different data mobility use-case scenarios because they can support (i) multiple logical networks for providing data mobility within the same storage cluster or across different storage clusters, (ii) implicit network scaling, which is useful for intra-cluster data mobility networks that are at least partially automatically generated, (iii) ordered configurations of data mobility target applications and initiator applications, (iv) the selection of any suitable IP ports on storage controllers for routing data traffic to dedicated network fabrics, and (v) the scaling of data mobility networks to a few network ports to many network ports for the purpose of providing multi-pathing, high availability, and so on.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

A computer program product can be configured to deliver all or a portion of specialized code and data for implementing the disclosed network scaling techniques. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by one or more processors or processing circuitry, the various techniques and/or methods disclosed herein.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of network scaling in a hyper-converged infrastructure (HCI) or heterogeneous storage cluster, comprising:
   providing a logical network of a storage cluster having a specified type and supporting one or more specified protocols, the logical network being associated with a plurality of Internet protocol (IP) addresses, the storage cluster including a plurality of storage controllers, each storage controller having a plurality of network objects associated therewith;
   for each storage controller, abstracting the plurality of network objects into a set of IP port abstractions; and
   assigning one or more of the plurality of IP addresses associated with the logical network to one or more network objects of one or more sets of IP port abstractions of the respective storage controllers,
   wherein the providing of the logical network includes providing a definition of the logical network that includes at least the specified type, the one or more specified protocols, and a specified IP address range for the plurality of IP addresses.

2. The method of claim 1 further comprising:
   validating input data pertaining to the definition of the logical network and the set of IP port abstractions of the storage controller to determine whether network scaling can be successfully performed in the storage cluster.

3. The method of claim 2 further comprising:
   having successfully validated the input data, assigning a respective IP address from among the plurality of IP addresses to each IP port abstraction from among the set of IP port abstraction to form a plurality of IP address/IP port pairs.

4. The method of claim 3 further comprising:
   for each IP address/IP port pair, configuring the IP address of the IP address/IP port pair on a physical or virtual network object specified by the IP port abstraction.

5. The method of claim 4 further comprising:
   aggregating groups of one or more IP address/IP port pairs from among the plurality of IP address/IP port pairs in a specified order.

6. The method of claim 5 further comprising:
   configuring one or more storage stack applications to interface or access the groups of IP address/IP port pairs in the specified order.

7. The method of claim 1 wherein the one or more specified protocols include a first specified protocol and a second specified protocol, and wherein the method further comprises:
   enabling the first specified protocol in the definition of the logical network; and
   disabling the second specified protocol in the definition of the logical network.

8. The method of claim 1 wherein the one or more specified protocols include a first specified protocol and a second specified protocol, and wherein the method further comprises:
   enabling the first specified protocol in the definition of the logical network; and
   enabling the second specified protocol in the definition of the logical network.

9. The method of claim 1 further comprising:
adding a new storage controller to the storage cluster, the new storage controller having one or more default network requirements,
wherein the providing of the definition of the logical network includes providing the definition of the logical network that includes a respective specified protocol at least partially satisfying the default network requirements of the new storage controller.

10. The method of claim 9 further comprising:
enabling the respective specified protocol in the definition of the logical network; and
automatically assigning a respective IP address associated with the logical network to a respective network object of a respective set of IP port abstractions of the new storage controller.

11. The method of claim 1 wherein the plurality of network objects include one or more of a physical network port, a virtual network port, and a bonded interface, and wherein the abstracting of the plurality of network objects includes, for each storage controller, specifying one or more of the physical network port, the virtual network port, and the bonded interface in the set of IP port abstractions.

12. The method of claim 11 wherein the storage controller is a physical storage controller, and wherein the assigning of the one or more of the plurality of IP addresses includes assigning one or more of the plurality of IP addresses associated with the logical network to the physical network port specified in a respective IP port abstraction of the physical storage controller.

13. The method of claim 11 wherein the storage controller is a virtualized storage controller, and wherein the assigning of the one or more of the plurality of IP addresses includes assigning one or more of the plurality of IP addresses associated with the logical network to the virtual network port specified in a respective IP port abstraction of the virtualized storage controller.

14. The method of claim 11 wherein the storage controller is a virtualized storage controller, and wherein the assigning of the one or more of the plurality of IP addresses includes assigning one or more of the plurality of IP addresses associated with the logical network to the bonded interface specified in a respective IP port abstraction of the virtualized storage controller.

15. The method of claim 14 wherein the assigning of the one or more of the plurality of IP addresses includes assigning one or more of the plurality of IP addresses to the bonded interface via one or more virtual local area networks (vLANs).

16. A system for network scaling in a hyper-converged infrastructure (HCI) or heterogeneous storage cluster, the system comprising:
a memory; and
processing circuitry configured to execute program instructions out of the memory to:
provide a logical network of a storage cluster having a specified type and supporting one or more specified protocols, the logical network being associated with a plurality of Internet protocol (IP) addresses, the storage cluster including a plurality of storage controllers, each storage controller having a plurality of network objects associated therewith;
for each storage controller, abstract the plurality of network objects into a set of IP port abstractions; and
assign or apply one or more of the plurality of IP addresses associated with the logical network to one or more network objects of one or more sets of IP port abstractions of the respective storage controllers,
wherein the plurality of network objects include one or more of a physical network port, a virtual network port, and a bonded interface, and
wherein the processor is further configured to execute the program instructions out of the memory to specify one or more of the physical network port, the virtual network port, and the bonded interface in the set of IP port abstractions.

17. A computer program product including a set of non-transitory, computer-readable media having instructions that, when executed by processing circuitry, cause the processing circuitry to perform a method comprising:
providing a logical network of a storage cluster having a specified type and supporting one or more specified protocols, the logical network being associated with a plurality of Internet protocol (IP) addresses, the storage cluster including a plurality of storage controllers, each storage controller having a plurality of network objects associated therewith;
for each storage controller, abstracting the plurality of network objects into a set of IP port abstractions; and
assigning one or more of the plurality of IP addresses associated with the logical network to one or more network objects of one or more sets of IP port abstractions of the respective storage controllers,
wherein the plurality of network objects include one or more of a physical network port, a virtual network port, and a bonded interface, and
wherein the abstracting of the plurality of network objects includes, for each storage controller, specifying one or more of the physical network port, the virtual network port, and the bonded interface in the set of IP port abstractions.

* * * * *